United States Patent
Parker et al.

(10) Patent No.: US 9,455,845 B2
(45) Date of Patent: Sep. 27, 2016

(54) WIRELESS COMMUNICATIONS APPARATUS

(71) Applicant: Kabushiki Kaisha Toshiba, Minato-ku (JP)

(72) Inventors: Steve Carl Jamieson Parker, Bristol (GB); Justin Coon, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/175,791

(22) Filed: Feb. 7, 2014

(65) Prior Publication Data

US 2014/0153614 A1  Jun. 5, 2014

Related U.S. Application Data

(63) Continuation of application No. 13/569,032, filed on Aug. 7, 2012, now abandoned, which is a continuation of application No. 13/088,028, filed on Apr. 15, 2011, now abandoned, which is a continuation of application No. 11/954,846, filed on Dec. 12, 2007, now abandoned.

(30) Foreign Application Priority Data

Dec. 20, 2006 (GB) .................. 0625445.2

(51) Int. Cl.
*H04B 1/00* (2006.01)
*H04L 25/02* (2006.01)
(Continued)

(52) U.S. Cl.
CPC ........... *H04L 25/0202* (2013.01); *H04B 1/713* (2013.01); *H04B 7/0413* (2013.01); *H04L 27/2601* (2013.01); *H04L 27/261* (2013.01); *H04L 25/0224* (2013.01)

(58) Field of Classification Search
CPC .......................... H04L 5/0053; H04W 72/042
USPC ........................................................ 375/133
See application file for complete search history.

(56) References Cited

U.S. PATENT DOCUMENTS 7,724,804 B2    5/2010  Yamasuge
2002/0150168 A1  10/2002  Crawford
(Continued)

FOREIGN PATENT DOCUMENTS

WO    WO 2005/062510 A1    7/2005

OTHER PUBLICATIONS

Office Action issued on Jun. 15, 2010 in the corresponding Japanese Patent Application No. 2007-328095.
(Continued)

*Primary Examiner* — Shuwang Liu
*Assistant Examiner* — Gina McKie
(74) *Attorney, Agent, or Firm* — Oblon, McClelland, Maier & Neustadt, L.L.P.

(57) ABSTRACT

MIMO UWB Communications apparatus is configured to send out a channel estimation sequence comprising a plurality of sequentially transmitted symbols in accordance with a first band hopping sequence, sent from one antenna of the apparatus, while another antenna is transmitting another sequence of channel estimation symbols in accordance with another, complementary band hopping sequence. A legacy device will be capable of synchronizing with the channel estimation symbols sent in accordance with the first band hopping sequence, while a MIMO receiver will be able to determine channel estimates for all MIMO channels on the basis of the combined channel estimation transmissions.

10 Claims, 9 Drawing Sheets

(51) Int. Cl.
  *H04L 27/26* (2006.01)
  *H04B 1/713* (2011.01)
  *H04B 7/04* (2006.01)

(56) References Cited

U.S. PATENT DOCUMENTS

| | | |
|---|---|---|
| 2005/0078598 A1 | 4/2005 | Batra et al. |
| 2005/0157638 A1* | 7/2005 | Maltsev ............ H04L 27/2608 370/203 |
| 2005/0249319 A1* | 11/2005 | Suh et al. .................... 375/347 |
| 2006/0072692 A1 | 4/2006 | Gifford et al. |
| 2007/0053282 A1* | 3/2007 | Tong et al. .................. 370/208 |
| 2007/0070944 A1* | 3/2007 | Rinne et al. ................. 370/329 |
| 2007/0211619 A1 | 9/2007 | Jalloul et al. |
| 2007/0211641 A1 | 9/2007 | Fu et al. |
| 2008/0101307 A1* | 5/2008 | Sindhushayana ... H04W 52/346 370/337 |
| 2009/0279623 A1* | 11/2009 | Wu ...................... H04L 5/0023 375/260 |
| 2011/0019753 A1* | 1/2011 | Ko et al. ...................... 375/260 |

OTHER PUBLICATIONS

Myung-Sun Baek, et al., "MB-OFDM UWB System with Multiple Antennas for High Capacity Transmission in Wireless Personal Area Network", Consumer Electronics, 2005. ICCE., IEEE, Jan. 12, 2005, 3 Pages.

W. Pam Siriwongpairat, et al., "Multiband-OFDM MIMO Coding Framework for UWB Communication Systems", IEEE Transactions on Signal Processing, IEEE, vol. 54, No. 1, Jan. 2006, 12 Pages.

* cited by examiner

The elements of the PLCP packet are:
- L-STF: Non-HT Short Training Field
- L-LTF: Non-HT Long Training Field
- L-SIG: Non-HT SIGNAL Field
- HT-SIG: HT SIGNAL Field
- HT-STF: HT Short Training Field
- HT-GF-STF: HT Greenfield Short Training Field
- HT-LTF1: First HT Long Training Field
- HT-LTFs: Additional HT Long Training Fields
- Data: The Data field includes the PSDU (PHY Service Data Unit)

Time measured in OFDM symbol periods

| | 0 | 1 | 2 | 3 | 4 | 5 | 6 |
|---|---|---|---|---|---|---|---|
| Antenna #1 | | 1+3(BG-1) | 2+3(BG-1) | 3+3(BG-1) | 1+3(BG-1) | 2+3(BG-1) | 3+3(BG-1) |
| Antenna #2 | | 2+3(BG-1) | 3+3(BG-1) | 1+3(BG-1) | 2+3(BG-1) | 3+3(BG-1) | 1+3(BG-1) |
| Antenna #3 | | 3+3(BG-1) | 1+3(BG-1) | 2+3(BG-1) | 3+3(BG-1) | 1+3(BG-1) | 2+3(BG-1) |

Time measured in OFDM symbol periods

| | 0 | 1 | 2 | 3 | 4 | 5 | 6 |
|---|---|---|---|---|---|---|---|
| Antenna #1 | | 1+3(BG-1) | 1+3(BG-1) | 2+3(BG-1) | 2+3(BG-1) | 3+3(BG-1) | 3+3(BG-1) |
| Antenna #2 | | 2+3(BG-1) | 2+3(BG-1) | 3+3(BG-1) | 3+3(BG-1) | 1+3(BG-1) | 1+3(BG-1) |
| Antenna #3 | | 3+3(BG-1) | 3+3(BG-1) | 1+3(BG-1) | 1+3(BG-1) | 2+3(BG-1) | 2+3(BG-1) |

WIRELESS COMMUNICATIONS APPARATUS

This application is a continuation of and claims the benefit of priority under 35 U.S.C. §120 from U.S. Ser. No. 13/569,032 filed Aug. 7, 2012, which is a continuation of U.S. Ser. No. 13/088,028 filed Apr. 15, 2011, which is a continuation of U.S. Ser. No. 11/954,846 filed Dec. 12, 2007 and claims priority under 35 U.S.C. §119 from United Kingdom Application No. 0625445.2 filed Dec. 20, 2006, the entire contents of each of which are incorporated herein by reference.

The present invention is concerned with wireless communication, and particularly, but not exclusively, with the process of channel estimation in a MIMO channel, such as using ultra wide band (UWB) technology for instance in establishing a wireless personal area network (WPAN) or wireless local area network (WLAN).

The ECMA-368 Standard was released in December 2005, and specifies technology to support a high-speed short range wireless network. To do this, the Standard defines a UWB physical (PHY) layer and medium access control (MAC) sublayer, utilizing all or part of the spectrum between 3100 MHz and 10600 MHz, supporting data rates of up to 480 Mb/s. It will be understood by the reader that the following description is not limited by such specifications, and further applicability of the present disclosure can be contemplated by the skilled person.

By way of background example, FIG. 1 shows the structure of the PHY layer convergence protocol (PLCP) preamble used in the ECMA-368 Standard. An alternative PLCP preamble used in burst mode is shown in FIG. 2. The burst mode preamble is only used for streaming applications, where a burst of packets is transmitted with each one separated by a packet minimum inter-frame separation (pMIFS). The preamble type that is employed is signified in the preceding PHY header.

Each preamble is arranged in two sections: a packet/frame synchronisation sequence and a channel estimation sequence. The channel estimation sequence is also used for fine carrier frequency estimation and fine symbol timing.

The ECMA-368 preambles are only designed for single-input single-output (SISO) multiband orthogonal frequency division multiplexing (MB-OFDM) UWB systems that use only a single antenna at the transmitter and the receiver. However, in light of the present development of multiple-input multiple-output (MIMO) technology, it would be possible to consider extending the technology proposed in the ECMA-368 Standard into a MIMO implementation, as this could be predicted to increase data rate and range.

Reception of a wireless transmission often involves a channel estimation step. It will be understood from this, that the field of the invention is not primarily concerned with applications of differential modulation. In the case of a SISO transmission, this is relatively straightforward, and is a process of dimensionality F, where F is the number of sub-carriers used to carry data, pilot information or guard tones.

In contrast, estimating a channel in MIMO communication inevitably involves determination of significantly more coefficients, M×N×F in number, where M and N are the numbers of transmit and receive antennas respectively. Thus the order of computational complexity is greater than for a SISO system involving the same subdivision of a communications band into subcarriers. As will be well known in the art, the various coefficients are normally arranged in a matrix, namely the MIMO channel matrix. Thus, it is desirable to provide an approach to using the preamble in a way which will provide channel matrix estimation without unduly increasing the complexity of the operation of the system.

A related problem has been tackled in the latest draft of the IEEE 802.11n WLAN standard, which extends the single antenna technology presented in IEEE 802.11a to a MIMO implementation. The preamble structures currently adopted for IEEE 802.11n are shown in FIG. 3. Two options are specified, depending on whether the WLAN contains exclusively IEEE 802.11n devices (Greenfield) or whether legacy support is also required (Mixed Mode). FIG. 3 also shows the legacy preamble for comparison (uppermost preamble in figure).

It is desirable, but not essential, to provide an approach which can operate within the constraints of legacy support—i.e. that a device constructed in accordance with (in this case) ECMA-368 can operate within acceptable performance criteria with more advanced communications devices.

The ECMA-368 preamble structures are unsuitable for a MEMO system and the IEEE 802.11n preambles are not designed to operate with a system that uses band hopping defined by time frequency codes (TFCs) for each piconet that is supported. An explanation of TFCs is provided below.

The ECMA-368 Standard is based on the former MB-OFDM Alliance's/WiMedia's proposal to IEEE 802.15.3a. The UWB spectrum, as defined by the FCC license exempt band for emissions of less than −41.3 dBm/MHz, extends from 3.1 GHz to 10.6 GHz. The ECMA-368 Standard divides this 7.5 GHz band into five Band Groups, as shown in table 24 of the ECMA-368 standard, First Edition, which is specifically incorporated by reference herein.

As shown in that table, four of the five Band Groups contain three bands of 528 MHz, whereas the fifth Band Group, which occupies the highest frequencies, contains two bands. This is merely due to limits on bandwidth, as governed by regulation, rather than for any compelling technical reason.

In the ECMA-368 Standard, two mechanisms are provided that each support multiple WPANs. The particular issue to be resolved when operating multiple WPANs is to avoid repeated attempts by two devices operating in different networks to use a single band of the communications channel. If two networks were inadvertently communicating on the same band, or band hopping in a synchronised manner between the same bands, then collisions would be a significant problem.

A first approach is to assign WPANs to operate in different bands or Band Groups. This approach is only effective up to a point, and clearly is limited to the number of available bands or Band Groups. In the case of ECMA-368, five Band Groups or 14 bands are defined, so only five mutually orthogonal WLANs can be defined, that use time frequency interleaving (TFI), or 14 that use fixed frequency interleaving (FFI). TFI and FFI will be explained in due course.

A second approach is to use different TFCs for each unique WPAN. In this way, two or more WPANs can be distinguished within a common Band Group. TFCs operate by dividing each packet into blocks of six OFDM symbols. Each of the OFDM symbols within each block of six is transmitted from a pre-assigned band from within the chosen Band Group. The bands used for each consecutive OFDM symbol are defined by the TFCs. Table 25 in the ECMA-368 Standard defines all of the TFCs used for the five Band Groups. This, again, is incorporated by reference.

Performance of the ECMA-368 Standard is maximised through the use of TFCs, by interleaving information bits throughout the blocks of six OFDM symbols to maximise frequency diversity. The TFCs that provide this frequency diversity are known as TFI logical channels. However, in certain circumstances it may be preferable to operate each WPAN in the same band at all times, and thus in this case the transmission is confined to a particular band—these are termed FFI logical channels.

A disadvantage of using TFI logical channels is that the preamble must estimate the channel for all three bands of the Band Group, whereas only one band needs to be estimated for FFI logical channels. The channel estimation part of the preamble (FIGS. 1 and 2) comprises six OFDM symbols and therefore, in practice, the overhead for TFI and FFI logical channels is identical, although the channel estimates for FFI are likely to be better (reduced noise due to more averages) thereby offsetting some of the performance lost due to poorer frequency diversity.

Application of this invention is particularly suitable when TFI logical channels are employed in a MIMO OFDM UWB system. Legacy support of ECMA-368 is then retained. FFI logical channels may also be supported in MIMO UWB systems, although this requires the introduction of an extra training field, with legacy support achieved by spoofing in the same manner as proposed in the draft IEEE 802.11n standard.

MIMO UWB can enhance the ECMA-368 specification in two respects: higher data rates; or, longer range, more robust performance (or a compromise of the two). When higher data rates are required it is important that the fixed duration overhead of the preamble is minimised: it would be counterproductive to transmit the payload of the packet at an ultra high rate, if the total duration of the packet would then be dominated by the time taken to transmit the preamble. Aspects of the invention provide a method for estimating the whole MIMO channel for a whole Band Group using only the time slot originally assigned for channel estimation of a single antenna system.

It would be desirable to provide a design that achieves MIMO UWB support and achieves this using a structure that is more efficient than the IEEE 802.11n preamble by exploiting the properties of TFCs.

Specific embodiments of the invention will now be described, by way of example only, with reference to the accompanying drawings, in which.

Figure 11:
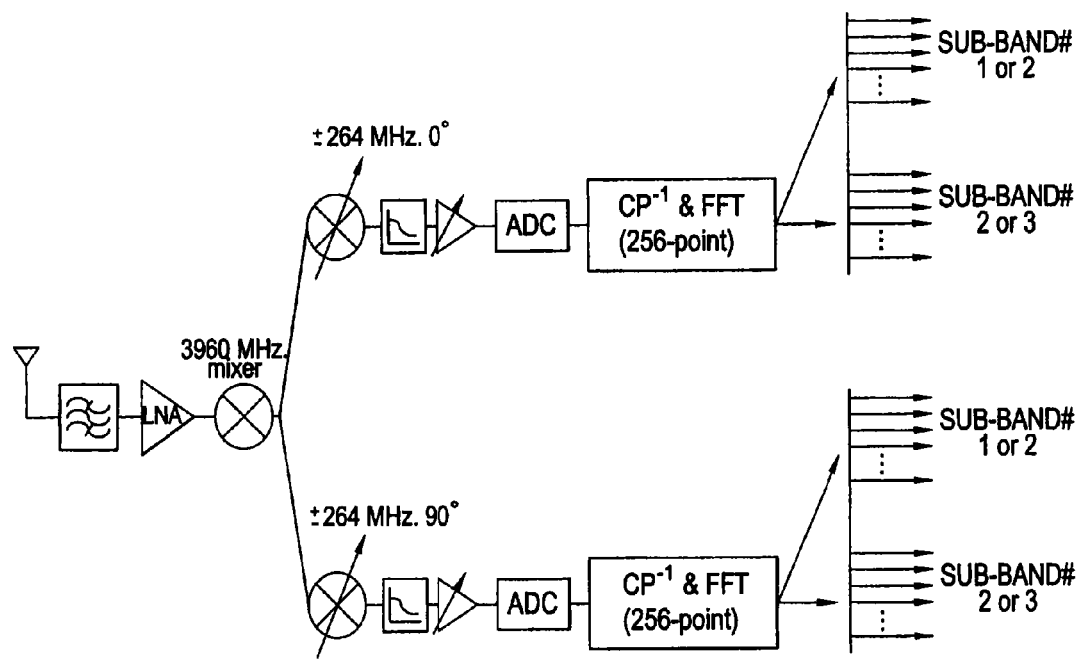
FIG. 11 is a schematic diagram of a MIMO receiver, in accordance with a fourth embodiment of the invention, named a digital "twin band" parallel receiver (only one receive chain of the MIMO system shown)
Figure 18:
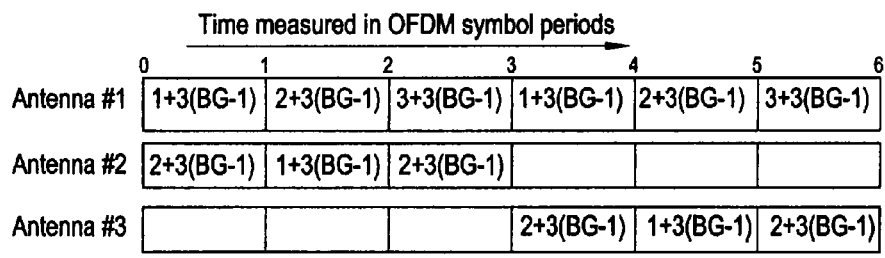
Figure 19:
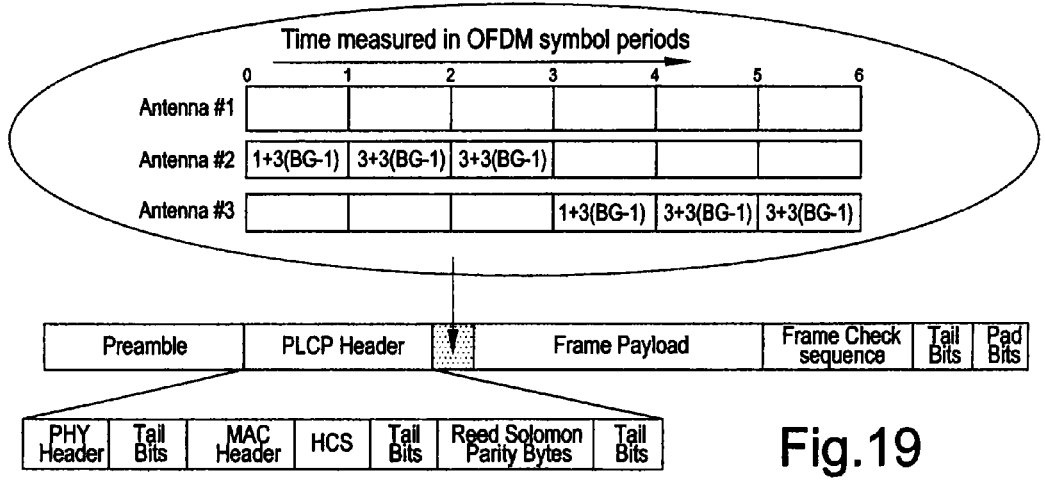

FIG. 18 illustrates schematically the parallel transmission of channel estimation sequences on different bands and three transmit antennas with legacy TFC1 transmitted from antenna #1 for the receiver illustrated in FIG. 11; and FIG. 19 illustrates schematically a frame structure for use with the receiver illustrated in FIG. 11, in accordance with the transmission method illustrated in FIG. 18, including insertion of an additional training field after the PLCP header.

A key aspect of the invention is that during channel estimation the MIMO receiver 'listens' on multiple bands simultaneously, using the separate receive branches. Two architectures that enable this parallel training are described below as alternative embodiments of the invention. Both comprise devices to operate in MIMO OFDM UWB receiving equipment to perform channel estimation.

Figure 1:
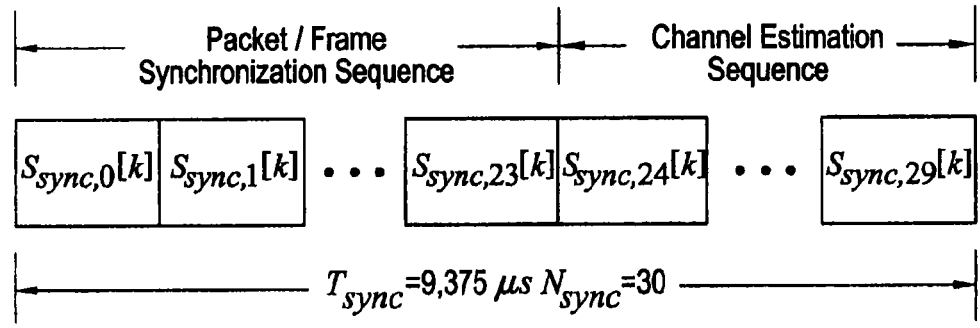
FIG. 1 is a frame timing diagram illustrating an extract of the ECMA-368 transmission preamble.
Figure 2:
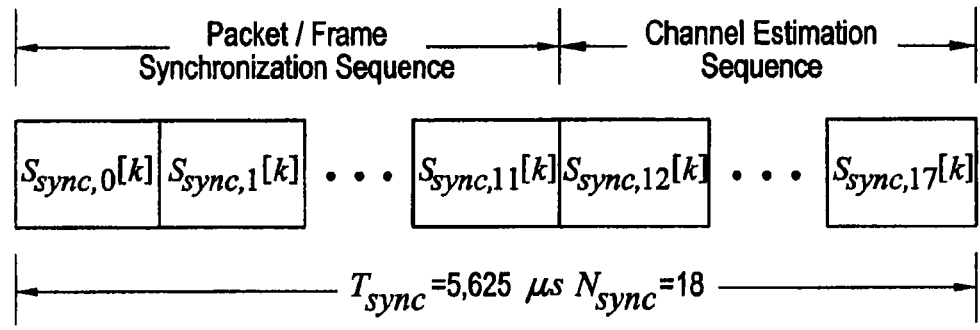
FIG. 2 is a frame timing diagram illustrating a further extract of the ECMA-368 transmission preamble.
Figure 3:
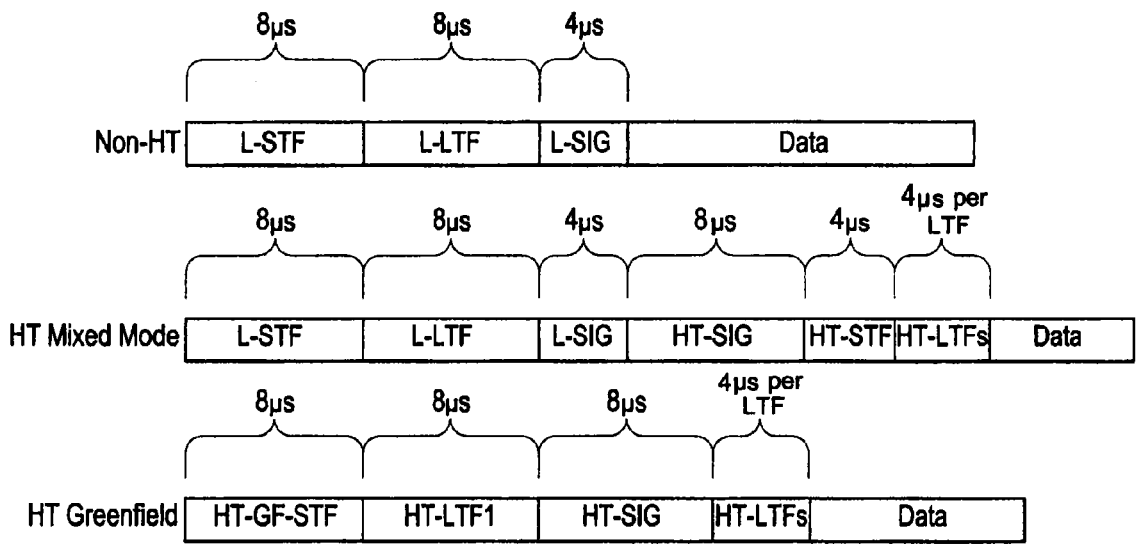
FIG. 3 is a diagram illustrating frames constructed in accordance with certain profiles of the IEEE 802.11n draft Standard.
Figure 4:
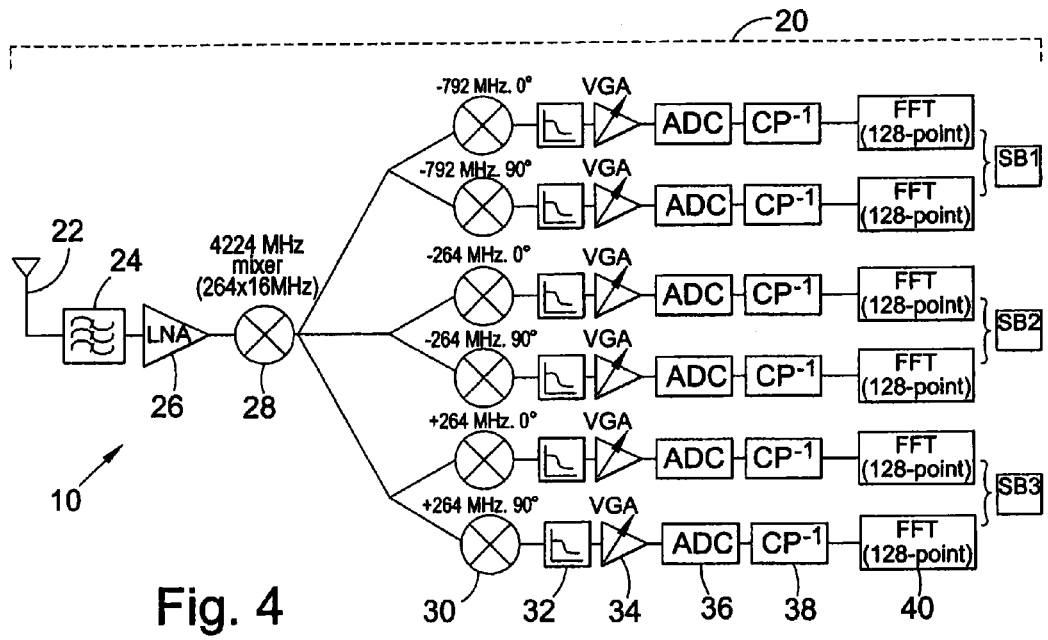
FIG. 4 is a schematic diagram of a MIMO receiver, in accordance with a first embodiment of the invention, named an analogue "triple band" parallel receiver, in which diagram only one receive chain of the MIMO receiver is shown.

The first embodiment, referred to herein as an analogue triple band parallel receiver 10, is shown in FIG. 4 (only a single receive chain is shown for clarity). In this embodiment, the illustrated receive chain 20 comprises a receive antenna 22, a band pass filter 24 tuned to the band of interest to the receive chain 20, a Low Noise Amplifier 26 to amplify what, in many cases, will be a very weak received signal on the antenna 22, and a mixer 28. The mixer 28 is operable to mix the wideband received signal with a 4.224 GHz centre frequency (for Band Group 1 operation). The resultant product signal is then passed to a plurality of further mixers

Figure 6:
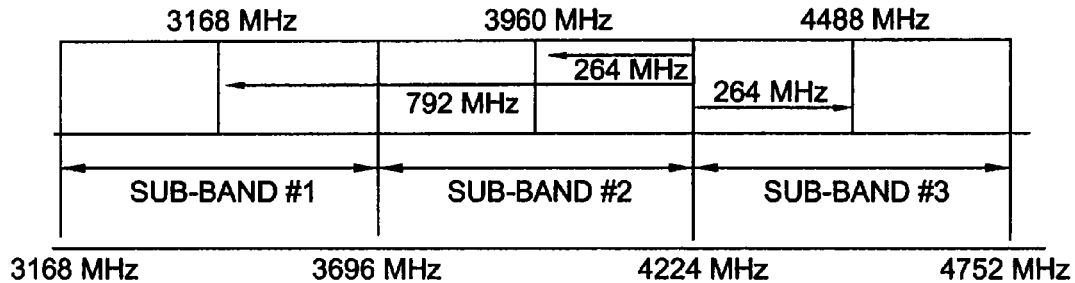
FIG. 6 illustrates organisation of Band Group 1 and realisation of the centre frequencies in a UWB arrangement conforming to ECMA-368.

30, operable to mix the product with centre frequencies set to define a low frequency band, an intermediate frequency band and an upper frequency band, in accordance with the frequency spectrum diagram set out in FIG. 6.

The separate branches for the individual frequency bands are split into quadrature mixers for retrieval of the quadrature I and Q signal components (by using 0° and 90° phase shifted mixers). The lowest frequency band is converted into a baseband signal by mixing with a frequency of 792 MHz (the difference signal 4224-792 MHz being used), the intermediate band by mixing with 264 MHz (the difference signal at 4224-264 MHz being used) and the upper band by also mixing with 264 MHz (the sum frequency 4224+264 MHz being used). FIG. 6 illustrates how the centre frequencies of the bands are obtained from the 4224 MHz signal.

The receive chain 20 of the first embodiment uses components similar to those proposed in a single-input single-output (SISO) chipset solution by Texas Instruments. It operates by initially down-converting the UWB transmission using a common oscillator. For example, for Band Group 1 operation (FIG. 6), this oscillator, whose centre frequency is 4224 MHz, is synthesized as a multiple (264×) of a 16 MHz crystal oscillator (264×16=4224). The resulting signal would be parsed into two or three parallel branches: two branches for a system with exclusively legacy devices, or transmitters with only two antennas (or both); or three branches if transmitters with three antennas might be present. Each of these branches is dedicated to a separate band and it is important to note that these are in addition to the branches needed for the MIMO receivers.

Figure 7:
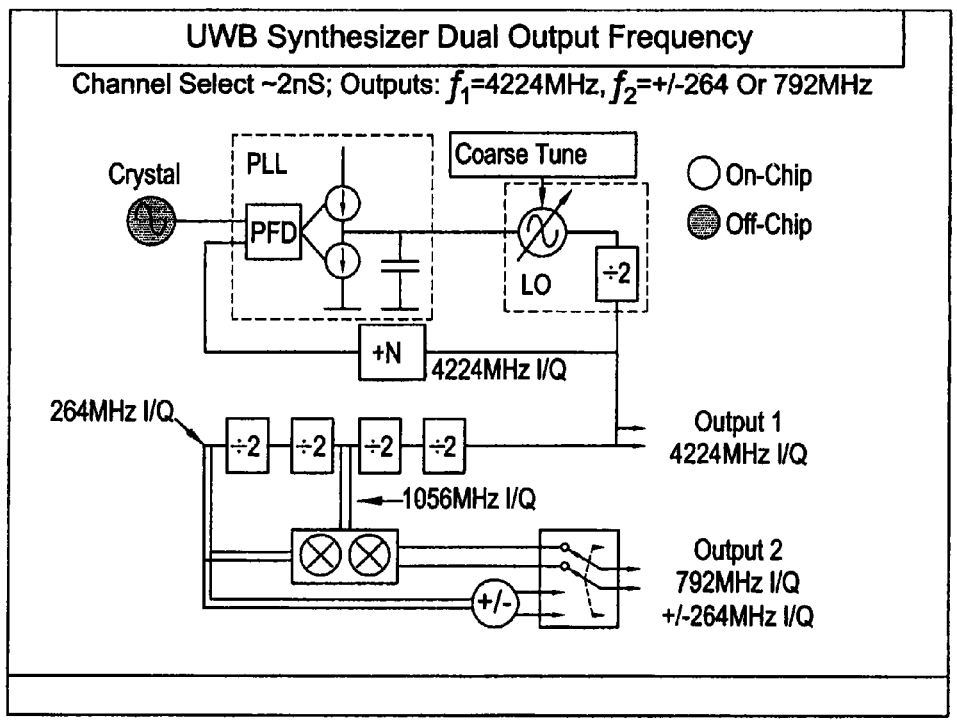
FIG. 7 illustrates a proprietary UWB centre frequency synthesiser for use in conjunction with embodiments of the invention.

FIG. 7 shows an extract from a presentation prepared by Texas Instruments in relation to its technology, entitled "High Performance CMOS Radio Design for Multi Band OFDM UWB". This diagram shows a chipset enabling generation of the 264 MHz and 792 frequencies using the 4224 MHz signal. The advantage of using this design is that drift of centre frequencies relative to each other will thereby be eliminated, as all centre frequencies will have been derived from a common source frequency.

Each branch signal is then passed through a low-pass filter 32, to remove unwanted components produced by the mixer, and then a variable gain amplifier 34. The signal is then converted from Analogue to Digital, in an analogue-to-digital converter (ADC) 36 and then the zero padded cyclic prefix (CP) is removed ($CP^{-1}$) 38. The digital data of each branch is then passed to an Fast Fourier Transform (FFT) block 40. Respective I and Q pairs of branches then give rise to subband data corresponding to one of the subbands defined by the bank of mixers 30.

Figure 5:
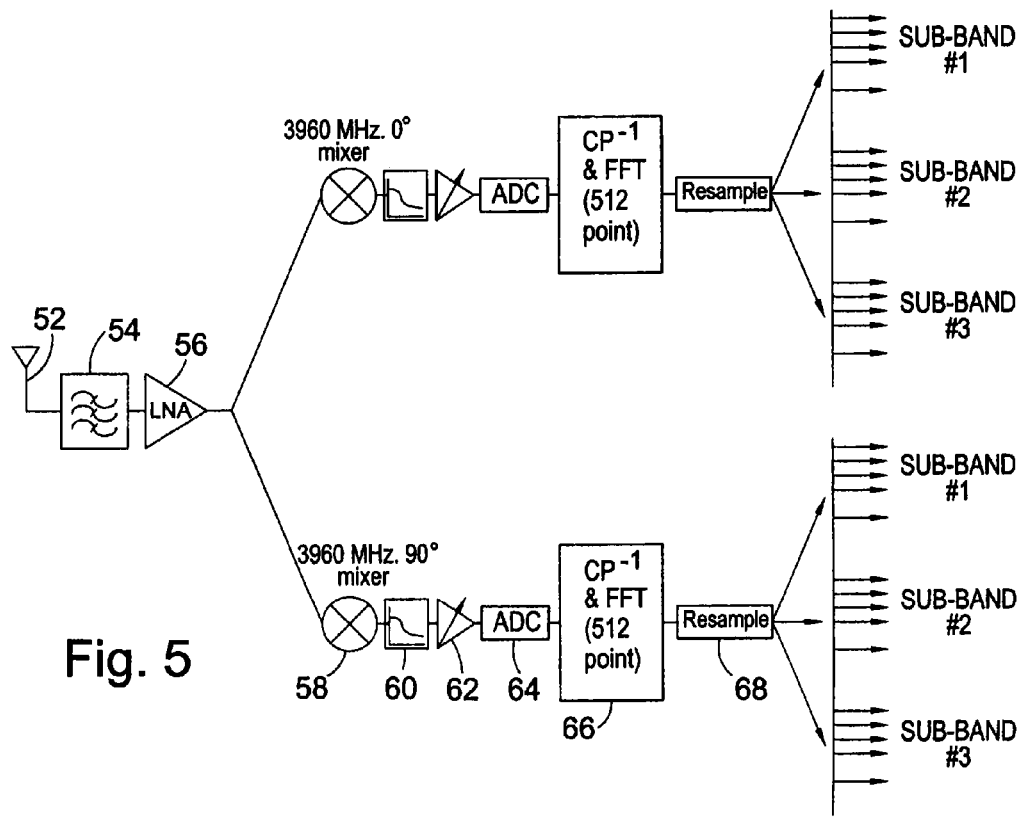
FIG. 5 is a schematic diagram of a MIMO receiver, in accordance with a second embodiment of the invention, named a digital "triple band" parallel receiver, in which diagram only one receive chain of the MIMO receiver is shown.

A second embodiment, termed herein a digital triple band parallel receiver 50, is shown in FIG. 5. In this case, one antenna 52 of the receiving device (there being multiple receive antennas in a typical MIMO device) receives a signal which is then passed through a band pass filter 54 as described in accordance with the first embodiment. This filtered signal is, again, amplified by an low noise amplifier (LNA) 56 and the resultant amplified signal is passed to two separate branches, corresponding to I and Q aspects of the signal. Mixers 58 are provided at quadrature to each other to achieve this. The signal of each branch is then passed through a low pass filter 60 and then a variable gain amplifier 62. The signal is then converted from Analogue to Digital, in an ADC 64 and then passed to a block 66 which removes the zero padded cyclic prefix ($CP^{-1}$) and applies an FFT. The FFT data is then resampled 68 to provide subband data in the I and Q senses with the same frequency spacing as used in the subcarriers of the transmitted OFDM symbols.

It should be emphasised, for the avoidance of doubt, that the distinguishing term 'analogue' in relation to the first embodiment is only used to describe how the individual bands are detected and accessed—both systems are digital in the sense that they employ OFDM modulation. It will also be understood that, in neither case is the entire receiver structure shown—after the FFT block, the following sequence of processing blocks will normally be provided:

Frequency domain equaliser.
Removal of pilots and time/frequency spreading.
De-mapping.
De-interleaving.
Viterbi decoding.
Descrambling.

However, the exact configuration of these later features is not part of the present invention, and specific exemplification of these is not required for the full and complete disclosure of the potential implementation of the invention.

If a two branch system is employed, referred to here as a twin-band receiver, then the branches would be retunable using the second of the mixers, similar to the manner in which current UWB devices are retuned between consecutive OFDM symbols (see later for example). Alternatively, if three branches are used (as per FIG. 4 and referred to here as a triple-band receiver) then the branches would be permanently dedicated to each of the bands and retuning is no longer necessary (this architecture could be used when transmitters with only two antennas are present, but if retuning is undesirable). Elimination of retuning could remove the need for the dedicated band switching time pBandSwitchTime (defined in ECMA-368 and specified as 9.47 ns) for Greenfield mode operation.

The digital solution described in relation to FIG. 5 operates by processing the whole or ⅔ of the Band Group in parallel using a larger FFT than is usually employed in contemporary UWB solutions (FIG. 5). Processing the Band Group in parallel (three bands) is preferred because otherwise a small amount of additional training must be employed, which means that the training overhead is greater than for the legacy SISO ECMA-368 solution (with spoofing used to provide legacy support). If the whole band is used then 128×3=384 tones would need to be decoded, which could be achieved by sub-sampling the frequency output of a 512-point FFT. In comparison, the current ECMA-368 system uses a 128-point FFT. It is anticipated that this increase in FFT complexity will be acceptable in the future. Furthermore, if future UWB systems employ channel bonding, as has been implemented in IEEE 802.11g/n systems (to enable concurrent operation on multiple bands to increase data rate and potentially range) then the provision of a device such as shown in FIG. 4 or FIG. 5 will inevitably be required.

Given either of the two architectures described above, it is possible to achieve efficient channel estimation for a MIMO UWB system, while retaining legacy ECMA-368 support. Examples are now given into how this is achieved for a M×N MIMO system, where M $\epsilon[1,2,3]$ is the number of transmit antennas and N is the number of receive antennas (any positive integer). Solutions are applicable for any number of receive antennas as they may all 'listen' concurrently. The examples given here are for two or three transmit antennas (one transmit antenna is a trivial case), with these solutions immediately extendable to any number of receive antennas.

Figures 8, 9, 10:
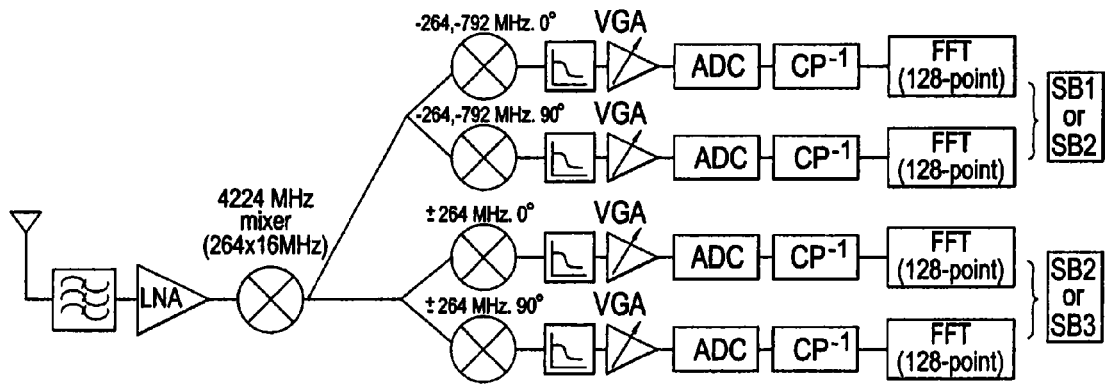
FIG. 8 illustrates schematically the parallel transmission of channel estimation sequences on different bands and antennas with legacy TFC1 transmitted from a first antenna, namely antenna #1.
FIG. 9 illustrates schematically the parallel transmission of channel estimation sequences on different bands and antennas with legacy TFC3 transmitted from antenna #1.
FIG. 10 is a schematic diagram of a MIMO receiver, in accordance with a third embodiment of the invention, named an analogue "twin band" parallel receiver (only one receive chain of the MIMO system shown)

FIG. 8 shows an example preamble structure for three transmit antennas which uses receiver chains that 'listen' on all three bands simultaneously. The two transmit antenna case is simply a sub-set of the scheme, with the third antenna ignored. An arbitrary number of receive antennas may be used with this arrangement. In the figure, the numbers refer to the Band ID within the particular Band Group (denoted BG) as defined in the ECMA-368 standard. For example, if Band Group 1 is being used then band 1 extends from 3.168 GHz to 3.696 GHz, band 2 from 3.696 GHz to 4.224 GHz and band 3 from 4.224 GHz to 4.752 GHz. With this definition of the bands, the first antenna is simply transmitting the legacy first TFC (TFC1 in table 25 in ECMA-368).

For each instant in time, propagation of a signal though a MIMO narrowband channel may be expressed in matrix form by:

$$Y=HX+V$$

where $Y \in C^{N \times 1}$ is the received signal, $H \in C^{N \times M}$ is the channel, $X \in C^{M \times 1}$ is the encoded codeword and $V \in C^{N \times 1}$ is temporally independent additive white Gaussian noise (AWGN), with entries $v_{i,j} \sim CN(0, N_0)$, where $N_0$ is the noise variance.

The purpose of the MIMO channel estimation process is to determine the N×M entries of H for every sub-carrier across the Band Group. The channel is assumed to be static for the duration of the packet and therefore the channel estimation preamble is only needed at the start of each packet.

With the channel estimation process of the present example, each MIMO receive branch estimates a row of H for ⅓ of the Band Group (528 MHz band) for each of the OFDM symbols in the preamble. With a total of six OFDM symbols in the preamble and the ensemble of receive antennas and branches for the frequency bands, the proposed scheme will enable two estimates to be made for each of the channel entries for all of the sub-carriers in the Band Group. This provides identical channel estimation accuracy as with the ECMA-368 SISO system, in the same training duration, despite the fact that M×N−1 more entries are estimated.

Transmit antennas 2 and 3 must transmit on bands that are orthogonal in frequency to one another and the frequency band of antenna 1 for this scheme to work. However, it will be recognised by the reader that the precise pattern shown in FIG. 8 is not the only scheme that will achieve this: the sequences from antennas 2 and 3 may be interchanged provided that all bands are estimated twice, and for each OFDM symbol period the transmissions occur from all three bands. These rules may be applied to enable parallel channel estimation for all TFI TFCs: for example, FIG. 9 shows the channel estimation preambles used for TFC3.

A receiver architecture may be desired which only monitors two bands concurrently, rather than the entire Band Group as discussed above. This system, referred to here as the twin-band receiver design rather than the triple-band receiver, provides a reduction in hardware complexity, cost, chip area and potentially power consumption. It does, however, complicate channel estimation and only enables two bands to be bonded in the future to realise higher data rates. The remainder of this section explains how this system works with two or three transmit antennas (and an arbitrary number of receive antennas).

Figures 12, 13, 14:
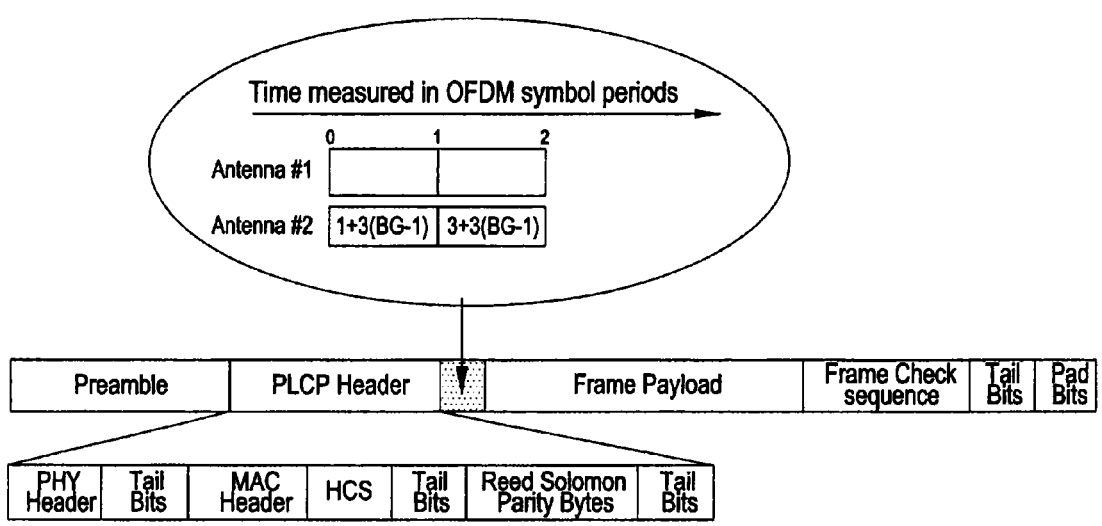
FIG. 12 illustrates schematically the parallel transmission of channel estimation sequences on different bands and two transmit antennas with legacy TFC1 transmitted from antenna #1 for the receiver illustrated in FIG. 10.
FIG. 13 illustrates schematically the parallel transmission of channel estimation sequences on different bands and two transmit antennas with legacy TFC1 transmitted from antenna #1 for the receiver illustrated in FIG. 11.
FIG. 14 illustrates schematically a frame structure for use with the receiver illustrated in FIG. 11, in accordance with the transmission method illustrated in FIG. 13, including insertion of an additional training field after the PLCP header.

Two architectures (analogue and digital parallel designs, where 'analogue' and 'digital' refer to the detectors as before) that could be used to implement the twin-band system are shown in FIGS. 10 and 11. The analogue system has an advantage because the two bands do not have to be adjacent, whereas the digital solution uses an FFT and the tones need to be contiguous across the two bands with no gap in between them. FIG. 12 shows an example preamble structure for the analogue receiver design when transmitters are present that are equipped with two antennas. The degrees of freedom in this system are sufficient for the training to be performed within the legacy channel estimation period and estimates are acquired with equal accuracy to the SISO implementation.

Figure 15:
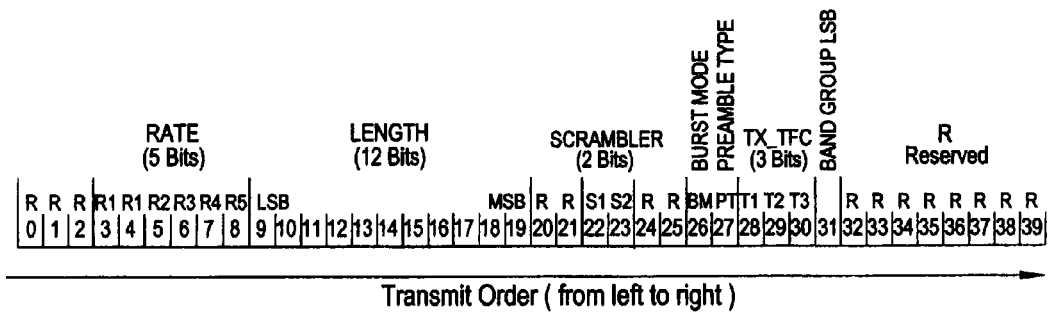
FIG. 15 illustrates assignment of bits in the ECMA-368 PHY header in accordance with embodiments of the invention.

An example preamble sequence for the digital twin-band design is shown in FIG. 13. For this architecture, the restriction of only being able to listen concurrently on adjacent bands means that for the second transmit antenna, band 2 is estimated four times, whereas bands 1 and 3 are estimated only once. To achieve the same channel estimation accuracy as SISO systems across all bands, it would therefore be necessary to transmit an additional channel estimation preamble to improve the channel estimates for bands 1 and 3 for the second transmit antenna. This extra sequence would have to be transmitted after the PHY layer convergence protocol (PLCP) header (FIG. 14) at the start of the frame payload. Legacy systems would have to be 'spoofed' to take account of the increased length of the frame payload due to the extra preamble to prevent them from interrupting the transmission. The length and rate fields in the PHY header at the beginning of the PLCP header (FIG. 15) would be adjusted so that the duration of the transmission takes account of the duration of the extra preamble. This is the same principle that is used in IEEE 802.11n for providing legacy support.

FIG. 14 is shown with vacant entries from the first transmit antenna but, in practice, these could be used to gain additional channel estimates for two out of the three bands from this antenna. The additional preamble training field represents an overhead of only two OFDM symbols which is 0.625 µs. If a packet has a length of 1 kb and the data rate is 480 Mb/s then the extra preamble still represents a sizeable overhead of 30%, so it is desirable to use a triple-band design if small packets are to be transmitted frequently at high data rates.

Figure 16:
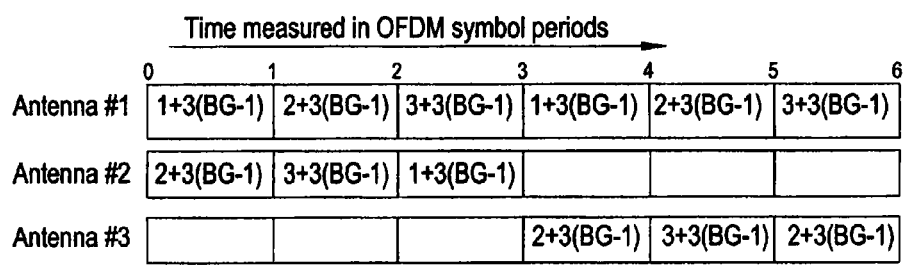
FIG. 16 illustrates schematically the parallel transmission of channel estimation sequences on different bands and three transmit antennas with legacy TFC1 transmitted from antenna #1 for use with the receiver of FIG. 10.
Figure 17:
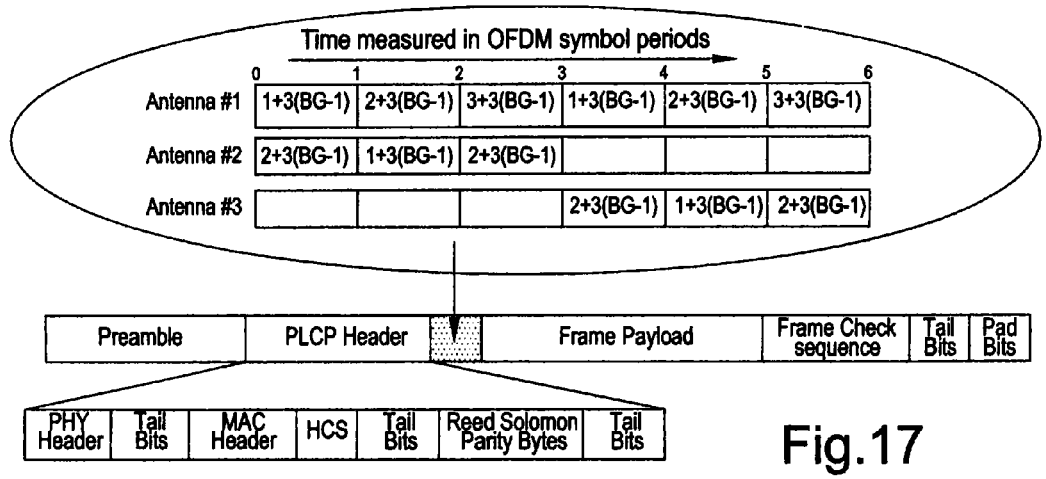
FIG. 17 illustrates schematically a frame structure for use with the receiver illustrated in FIG. 11, in accordance with the transmission method illustrated in FIG. 16, including insertion of an additional training field after the PLCP header.

A preamble structure that can be used when transmitting from three antennas with an analogue twin-band receiver is shown in FIG. 16. This structure is capable of estimating the full channel within the same duration as the SISO preamble. However, only one estimate of the channel response is obtained for the second and third transmit antennas (the SISO system acquires two estimates for all transmit antennas). Channel estimation accuracy can only be improved by transmitting the sequence again after the PLCP header as shown in FIG. 17 (with spoofing used for legacy support).

The structure used when transmitting from three antennas with a digital twin-band receiver is shown in FIG. 18. This is similar to the preamble structure in FIG. 16 except that the receiver can only 'listen' on adjacent channels. Consequently, an additional preamble is required (FIG. 19) to obtain the missing channel responses. Additional channel estimation OFDM symbols can be included in the vacant cells of FIG. 19 for each symbol period, if desired, to further improve those estimates (transmissions are allowed on a maximum of two bands simultaneously).

In conclusion, therefore, embodiments of the invention provide a channel estimation MIMO solution where only SISO solutions existed previously. MIMO UWB systems can increase data rate and range over their SISO counterparts. Embodiments of the invention as described above minimise the additional overhead of channel estimation when implementing UWB while retaining legacy compatibility. When transmitting short packets at high data rates it is important that the length of the channel estimation preamble is minimised.

The invention claimed is:

1. Communications apparatus comprising a plurality of antennas suitable for establishing a wideband MIMO communications channel with another communications apparatus, said wideband MIMO communications channel having at least two subbands defined therein with respect to frequency, the communications apparatus being operable, to transmit from each of said antennas a signal within one or more of said subbands defined in said channel, said signal having a frame structure, the frame structure comprising a data portion and a preamble before the data portion, to transmit within the preamble of the signal a channel estimation sequence comprising a plurality of OFDM symbols for use by a receiver in estimating the MIMO communications channel, each OFDM symbol in the channel estimation sequence being repeated at least once within the channel estimation sequence, the OFDM symbols each being transmitted within a respective symbol period, the channel estimation sequence being modulated onto a plurality of band portions defined in said wideband communications channel, the apparatus being operable to transmit said channel estimation sequence from a first one of said antennas by way of a band hopping sequence between two or more of said subbands, and to transmit a channel estimation sequence comprising the same repeated plurality of OFDM symbols from a second one of said antennas by way of a second, complementary band hopping sequence between two or more of said subbands, such that over the course of the preamble, the first and second antennas both transmit the same repeated plurality of OFDM symbols but in different symbol periods from one another.

2. Apparatus in accordance with claim 1, wherein the communications apparatus is operable to transmit within the preamble a channel estimation sequence comprising six OFDM symbols.

3. Apparatus in accordance with claim 2, comprising three transmit antennas and wherein the communications apparatus is operable to transmit in parallel on all three transmit antennas within the preamble of the signal over six OFDM symbol periods.

4. Communications apparatus suitable for use with apparatus in accordance with claim 3, wherein said apparatus comprises a plurality of receive antennas, suitable for resolving a multiple antenna transmitted signal, channel estimation sequence detection means for detecting in accordance with a first band hopping sequence a channel estimation sequence and, in accordance with a second, complementary, band hopping sequence, a second channel estimation sequence.

5. Communications apparatus suitable for use with apparatus in accordance with claim 2, wherein said apparatus comprises a plurality of receive antennas, suitable for resolving a multiple antenna transmitted signal, channel estimation sequence detection means for detecting in accordance with a first band hopping sequence a channel estimation sequence and, in accordance with a second, complementary, band hopping sequence, a second channel estimation sequence.

6. Communications apparatus suitable for use with apparatus in accordance with claim 1, wherein said apparatus comprises a plurality of receive antennas, suitable for resolving a multiple antenna transmitted signal, channel estimation sequence detection means for detecting in accordance with a first band hopping sequence a channel estimation sequence and, in accordance with a second, complementary, band hopping sequence, a second channel estimation sequence.

7. Communications apparatus in accordance with claim 6 wherein said channel estimation sequence detection means is operable to detect a third channel estimation sequence in accordance with a third, additionally complementary, band hopping sequence.

8. Communications apparatus suitable for use with apparatus in accordance with claim 1, wherein said apparatus comprises a plurality of receive antennas, suitable for resolving a multiple antenna transmitted signal, channel estimation sequence detection means for detecting in accordance with a first band hopping sequence a channel estimation sequence and, in accordance with a second, complementary, band hopping sequence, a second channel estimation sequence.

9. Method of transmitting channel estimation sequences in a wideband MIMO system, comprising:

transmitting a signal having a frame structure, the frame structure comprising a data portion and a preamble before the data portion, the preamble comprising a sequence for use by a receiver in estimating the MIMO communications channel, wherein transmitting the preamble comprises, transmitting from a first antenna a sequence of channel estimation symbols in accordance with a first band hopping sequence defined for the channel, the channel estimation sequence comprising a plurality of OFDM symbols, each OFDM symbol in the channel estimation sequence being repeated at least once within the channel estimation sequence, the OFDM symbols each being transmitted within a respective symbol period;

transmitting from a second antenna a channel estimation sequence comprising the same repeated plurality of OFDM symbols in accordance with a second band hopping sequence defined for the channel, the second band hopping sequence being complementary with the first band hopping sequence, such that over the course of the preamble, the first and second antennas transmit the same repeated plurality of OFDM symbols but in different symbol periods from one another.

10. Method in accordance with claim 9 wherein the first band hopping sequence is compatible with existing equipment to enable a SISO receiver equipped with the band hopping sequence to successfully receive the channel estimation symbols as if transmitted from a single antenna device.

* * * * *